United States Patent [19]

Stan et al.

[11] Patent Number: 5,045,386

[45] Date of Patent: Sep. 3, 1991

[54] PRESSURE-SENSITIVE FILM COMPOSITE HAVING IMPROVED ADHESION TO PLASTICIZED VINYL SUBSTRATES

[75] Inventors: Lelia A. M. Stan, Duesseldorf; Naimul Karim, Dormagen; Georg H. Feichtmeier, Rommerskirchen; Heiner Johannsen, Viersen, all of Fed. Rep. of Germany

[73] Assignee: Minnesota Mining and Manufacturing Company, St. Paul, Minn.

[21] Appl. No.: 305,154

[22] Filed: Feb. 1, 1989

[51] Int. Cl.$^5$ .................. B32B 7/12; B32B 25/02; B32B 25/14

[52] U.S. Cl. .................. 428/262; 428/353; 428/354; 428/355; 428/423.3; 428/424.7; 428/520

[58] Field of Search ............ 428/353, 354, 355, 424.7, 428/423.3, 522, 520, 522, 246, 262; 525/205, 218

[56] References Cited

U.S. PATENT DOCUMENTS

| | | |
|---|---|---|
| 2,535,852 | 12/1950 | Hatfield et al. ............ 260/27 |
| 2,601,016 | 6/1952 | Hendricks ............ 428/355 |
| 2,819,010 | 1/1958 | Amiguet ............ 229/62 |
| 2,879,252 | 3/1959 | Been et al. ............ 260/45.5 |
| 3,076,588 | 2/1963 | Conway et al. ............ 229/3.5 |
| 3,092,250 | 6/1963 | Knutson ............ 428/353 |
| 3,330,720 | 7/1967 | Stevens et al. ............ 161/162 |
| 3,339,788 | 9/1967 | Lipske ............ 220/53 |
| 3,380,938 | 4/1968 | Jack et al. ............ 260/4 |
| 3,406,039 | 10/1968 | Paufler ............ 117/76 |
| 3,455,859 | 7/1969 | Korpman ............ 260/25 |
| 3,692,742 | 9/1972 | Underwood ............ 428/424.7 |
| 3,741,786 | 6/1973 | Torrey ............ 117/3.1 |
| 3,833,689 | 9/1974 | Usamoto ............ 525/218 |
| 3,861,956 | 1/1975 | Schwarcz ............ 117/68.5 |
| 3,922,421 | 11/1975 | Frank ............ 428/355 |
| 3,924,748 | 12/1975 | Braverman ............ 206/534.1 |
| 3,956,218 | 5/1976 | Keppler ............ 525/205 |
| 3,971,865 | 7/1976 | Murakami ............ 428/355 |
| 4,102,835 | 7/1978 | Freeman et al. ............ 260/5 |
| 4,166,706 | 9/1979 | Korpman ............ 400/696 |
| 4,212,912 | 7/1980 | Wartusch et al. ............ 428/209 |
| 4,230,761 | 10/1980 | Watts ............ 428/215 |
| 4,248,917 | 2/1981 | Hornibrook et al. ............ 428/40 |
| 4,483,018 | 11/1984 | Whelan ............ 383/5 |
| 4,605,592 | 8/1986 | Pacquette ............ 428/355 |

FOREIGN PATENT DOCUMENTS 0193295 7/1988 European Pat. Off. .
117652 9/1981 Japan ............ 428/424.7

OTHER PUBLICATIONS

"Materials for Adhesives" by B.F. Goodrich, Mar. 1981, pp. 4–12.
Copending U.S. Application Serial No. 703,229 (Atty. docket No. 40096 U.S.A. 5A) filed 2/20/85; "Non-tacky Acrylonitrile/Butadiene Adhesive Tape".

*Primary Examiner*—Jenna Davis
*Attorney, Agent, or Firm*—Gary L. Griswold; Walter N. Kirn; Andrew D. Sorensen

[57] ABSTRACT

A pressure-sensitive film composite ideally suited for providing a graphic or decorative pattern to a plasticized polyvinyl chloride surface, comprising a polymeric film containing a pressure-sensitive adhesive on a surface thereof, the adhesive comprising at least one nitrile butadiene rubber.

7 Claims, No Drawings

PRESSURE-SENSITIVE FILM COMPOSITE HAVING IMPROVED ADHESION TO PLASTICIZED VINYL SUBSTRATES

BACKGROUND OF THE INVENTION

This invention relates to pressure sensitive film composites, and more specifically to such composites having excellent adhesion to plasticized vinyl substrates, both initially and after an extended period of time, and at varying temperatures.

Polyvinyl chloride, or as it is more commonly referred to, "vinyl", is one of the most versatile and widely used synthetic polymers in today's society. For many uses, it is desired that the vinyl be flexible, and thus a plasticizer is compounded with the vinyl. This allows preparation of materials having a myriad of uses.

Such plasticized vinyls typically contain from about 15 to about 50% by weight of monomeric or polymeric plasticizers; because monomeric plasticizers are less expensive, they are commonly employed. Unfortunately, however, monomeric plasticizers are of relatively low molecular weight, thus tending to migrate to the surface of the vinyl film, and into materials with which the vinyl surface comes in contact. This latter tendency is well known; see, for example, U.S. Pat. No. 4,284,681. Therefore, when a pressure sensitive adhesive is applied to a plasticized vinyl substrate and allowed to remain in contact therewith for an extended period of time, plasticizer from the vinyl tends to migrate into the adhesive, softening it and causing a significant decrease in adhesion, see, for example, U.K. Pat No. 1,051,125.

If the vinyl article is, for example, a flexible sign material, a banner, or a truck tarpaulin which is decorated with a graphic marking film attached to the vinyl with a pressure sensitive adhesive, the graphic film will lose adhesion and may become undesirably wrinkled after migration of the plasticizer from the vinyl into the adhesive. In addition, when severe flexing or flapping of the vinyl occurs, such as with canvas-sided trucks, and especially at low temperatures, cracking of the graphic film can result.

Attempts have been made to solve the plasticizer migration problem by interposing an impenetrable barrier layer between the vinyl and the adhesive; see, e.g., U.S. Pat Nos. 4,045,600 and 4,605,592, and E.P. Pat. Spec. 103,407. Others have disclosed adhesives taught to be less susceptible to attack by plasticizer; see e.g. Graziano et al, Development of Acrylic Latex Pressure Sensitive Adhesive for Plasticized PVC Films, *Journal of Plastic Film & Sheeting, Vol.* 2, April 1986, pp. 95–110. One commercially available tape widely used for adhering to plasticized vinyl is based on an adhesive which is a terpolymer of 2-ethyl hexyl acrylate, vinyl acetate and ethyl acetate.

Yet another attempt to prevent undesired plasticizer migration into an an adhesive has been to incorporate plasticizer itself into the adhesive, thereby reducing the plasticizer gradient between the contacting layers; see, e.g., U.S. Pat. No. 4,272,573; U.K. Pat. Spec. 2,162,191-A; and E.P. Pat. Spec. 150,978.

Despite limited success achieved by the attempts discussed above, there remains a strong commercial desire to provide a graphic film which can be adhered to flexible vinyl articles such as canvas truck sides, awnings, signing, etc., which is subject to extremes of temperature variation as well as severe flexing, and for extended periods of time. Applicants have now discovered that such can be achieved when the adhesive used for attaching the graphic film to such vinyl articles is based on nitrile butadiene rubber (NBR).

DETAILED DESCRIPTION

Useful NBRs for preparing the adhesives of the invention include both hydrogenated and non-hydrogenated rubbers in solid or liquid form and with varying acrylonitrile content, e.g., from about 10 to about 45% by weight. Examples of commercially available rubbers include "Therban" 1707 (hydrogenated, 34% bound acrylonitrile) and "Perbunan" 3312NS (non-hydrogenated, 34% bound acrylonitrile), both available from Bayer Aktiengelleschaft; "Nipol" N-30L (non-hydrogenated, 30% bound acrylonitrile) and "Zetpol" 1020, 2010, and 2020 (partially hydrogenated, 45%, 37% and 37% bound acrtylonitrite, respectively), all available from Nippon Zeon; various rubbers from B.F. Goodrich, e.g., "Hycar" 1300X23 and various other "Hycar" NBRs from B.F. Goodrich (all non-hydrogenated with varying acrylonitrile content). Other examples include nitrile rubbers which are terpolymers of acrylonitrile/butadiene/isoprene, e.g., "Nipol" NBR DN-1201 and DN-1201L (both non-hydrogenated from Nippon Zeon).

Various additives can be included with the NBR-based adhesive to modify or optimize characteristics. For example, conventional acrylic PSAs can be included with an NBR adhesive system to aid in controlling initial tack of the adhesive to allow some initial repositionability of the composite without detracting from the final bond strength. Similarly, a minor amount of a conventional PSA may increase ply adhesion between the adhesive and polymeric film in some instances.

The adhesive layer can be formed by conventional techniques such as solvent casting onto a liner, etc., depending on the characteristics of the NBR. For example, some NBRs are available dispersed in latex form and can thus be used directly.

Adhesives should generally be applied at dry coating weights of from about 20 to about 50 grams per square meter to provide suitable adhesion to a vinyl surface.

The outer layer of the novel composite, i.e., that designed to provide the decorative graphics to the composite can be basically any polymeric film forming material compatible with the adhesive. By compatible is meant that there is no deleterious interaction between the two so as to reduce the properties of either the adhesive or the polymeric film.

Typical examples of polymeric film formers which are acceptable include polyurethanes, olefins, vinyl, and combinations thereof. In addition, multiple layers can be utilized. With flexible vinyl coated canvas truck sides, a polyurethane film is preferred because of the greater flexibility and durability of urethane films. One problem with such films, however, especially when based on an aqueous dispersible polyurethane, is the moisture sensitivity of such films, which can result in wrinkling or blistering of the film and potential delamination from the underlying adhesive. In this instance, a second or intermediate film having better moisture resistant characteristics can be utilized to minimize the effects of moisture. This intermediate film would thus act as an adhesion promoter between the outer film and the adhesive.

A preferred film combination, especially for use on vinyl-coated canvas truck sides, is an outer film comprising an aliphatic polyester polyurethane together with an intermediate film of an aliphatic polyurethane having hydrophobic properties.

The polymeric films can be produced by conventional means, such as casting from solvent or aqueous system directly onto the adhesive, casting on a separate liner and laminating to the adhesive, etc. The casting solution may contain adjuvants as desired, such as pigments, wetting agents, etc. When formed of more than one layer, each layer can contain such adjuvants. Care must be taken in the choice of solvents such that the adhesive layer is not adversely affected.

Where the polymeric film consists of a single layer, the thickness is preferably between about 50 and 150 microns. Where the film is of two layers, such as the aliphatic polyurethane followed by the polyester polyurethane, the thickness of the aliphatic polyurethane is preferably from about 3 to about 50 microns, more preferably from about 5 to 10 microns.

As noted above, both hydrogenated and non-hydrogenated NBRs can be used, or mixtures thereof. In the event a non-hydrogenated NBR is used, either alone or in admixture, conventional antioxidants should be included in the adhesive to prevent undesired reaction due to heat and the effects of UV light.

Manufacture of the composite of the invention can be undertaken using conventional techniques. For example, the optional protective cover sheet or liner of the composite can be coated with the adhesive from solvent, the solvent removed by heating appropriately to a dried state, followed by coating a solution of the polymeric film, and again drying. If a second polymeric film is to be used, further coatings can be applied. In this fashion, the film composite is manufactured by continuous application of the desired layers on the liner. Conversely, the polymeric film layer can be prepared on a separate casting liner, with the adhesive applied to the protective cover sheet, followed by lamination of the two constructions and removal of the intermediate casting liner.

The composite film of the invention is ideally suited for adhesion to, for example, canvas truck sides typically made from woven polyester which has been treated or coated with plasticized vinyl, or other similar treated surfaces, such as awnings, signing, etc. The adhesive of the composite has been found to be sufficiently stable to contact with migrating plasticizer such that adhesive strength will be maintained over long time periods at varying temperatures. In addition, the adhered composite has very little effect on the flexibility of the underlying substrate and is resistant to cracking, very meaningful when, for example, that substrate is the canvas side of a truck.

The protective liner, while not necessary for functioning of the adhesive composite of the invention is typically used to protect the adhesive layer during handling, shipping, etc. It is of course designed to be removed immediately prior to application of the composite to a vinyl substrate. Examples of suitable liners include siliconized paper, polymer-coated paper, a polymer film, clay-coated paper, etc. Each liner should be capable of withstanding the elevated temperatures encountered during the manufacture of the film composite.

The invention will now be more fully described by the following non-limiting examples, wherein all parts are by weight unless otherwise specified.

EXAMPLE 1

A polyethylene-treated paper was coated with a 20% by weight solution of "Therban" 1707 NBR in methyl ethyl ketone to a wet thickness of 150 microns, followed by drying at 80° C. for 10 minutes, resulting in an adhesive layer having a coating weight of 36 grams/square meter.

Onto this adhesive layer was coated a solution of a 5% by weight aliphatic polyester polyurethane ("DESMOLAC" 4125, commercially available from Bayer AG) in a 1:1:1 by volume toluene:isopropanol:diacetone alcohol solvent at a wet thickness of between 50 and 70 microns. After drying for 5 minutes at 80° C., a 5 micron thick coating of the polyurethane was obtained.

Over this layer, serving essentially as a primer or adhesion promoter, were applied two separate coatings of an aqueous polyurethane dispersion ("Acralen" U from Bayer AG or PU 402A from Mobay) which were pigmented with a predispersed pigment paste ("Luconyl" series from BASF). Each coating was applied at a wet thickness of 150 microns and dried for 1 minute at 70° C. and 4 minutes at 110° C., providing a total thickness of 120 microns.

EXAMPLE 2

Example 1 was repeated with the exception that the aliphatic polyurethane interlayer was itself pigmented and coated as a 28% solids solution in toluene/isopropanol to a wet thickness of 120 microns. After drying at 80° C. for 5 minutes, the dry coating had a thickness of 40 microns.

EXAMPLE 3

Example 1 was repeated with the exception that only the aliphatic polyurethane was used, and applied in two coatings, each having a wet thickness of 150 microns. After drying each coating at 110° C., the total film thickness was 90 microns.

EXAMPLE 4

The pigmented aqueous polyurethane of Example 2 was coated as two separate layers onto a liner, each having a wet thickness of 150 microns, and dried as per Example 1. The dried coating was then overcoated with the aliphatic urethane solution of Example 1 and dried at 80° C. Similar to Example 1, an adhesive was coated onto a polyethylene treated paper to a dry coating weight of 38 grams/square meter. The two constructions were then laminated to each other at room temperature to provide a finished composite.

EXAMPLE 5

Example 1 was repeated with the exception that a clay coated paper was used as the liner and an aliphatic polycarbonate polyurethane (XW-123 from Mobay Chemical) was used instead of the polyester polyurethane. The polycarbonate urethane was prepared as a 35% solids aqueous solution and pigmented with a TiO2 dispersion at 25 phr.

EXAMPLE 6

To provide a comparative example, a pigmented polyvinyl chloride (PVC) film of 0.037 mm thickness on a paper carrier web was coated with a 25% solids solution of the aliphatic urethane of Example 1 using a conventional knife coater to a dry coating thickness of 0.012 mm.

An adhesive composition of 56% isooctyl acrylate, 40% vinyl acetate, and 4% acrylic acid at 20% solids in ethyl acetate and toluene was knife coated onto a paper release liner. The adhesive was dried for 10 minutes at 150° F. to provide a dry coating weight of 42 grams/square meter.

The adhesive was then laminated at room temperature to the urethane, leaving the PVC surface exposed.

EXAMPLE 7

Stabilized "Primacor" 3440, an ethylene/acrylic acid (EAA) polymeric material available from Dow Chemical, was extruded to a film of 0.05 mm thickness. A 20% solids solution of "Therban" 1707 was then coated onto the EAA film and dried at 70° C. for 10 minutes.

EXAMPLE 8

A pigmented polyvinyl chloride film with approximately 40 phr of a monomeric plasticizer and a thickness of 0.12 mm was laminated to the adhesive of Example 1 on a release liner at room temperature, the coating weight of the adhesive being 34 grams/square meter.

EXAMPLE 9

To provide another comparative example, Example 4 was repeated with the elimination of the aliphatic polyurethane.

EXAMPLE 10

Example 1 was duplicated, with the exception that the adhesive was coated from a 20% by weight solution in methyl ethyl ketone of a non-hydrogenated NBR with 34% bound acrylonitrile ("Perbunan" 3312 from Bayer). The coating solution also contained 2 to 5% by weight of rubber of Irganox PS 800 from Ciba Geigy, an antioxidant for stabilization.

EXAMPLE 11

Example 10 was duplicated with the exception that the adhesive was applied from a 20% by weight solution in methyl ethyl ketone of a mixture of 60% by weight hydrogenated NBR ("Therban" 1707) and 40% non-hydrogenated NBR ("Perbunan" 3312). Again, 5% by weight based on solids of an antioxidant was added to the coating solution for stabilization.

EXAMPLE 12

Example 1 was duplicated with the exception that an acrylic adhesive, 90/10 butyl acrylate/acrylic acid, was coated onto a silicone release liner and dried at 70° F. for 10 minutes.

EXAMPLE 13

Example 12 was duplicated with the exception that 75% by weight of "Therban" 1707 was mixed with the acrylic adhesive.

EXAMPLES 14-15

Example 1 was duplicated with the exception that "Nipol" DN-1201 (Example 14) and DN-1201L (Example 15), both non-hydrogenated NBRs, were substituted for the "Therban" 1707. The DN-1201 was applied at a coating weight of 32.8 grams/square meter from an approximately 15% by weight solution in a 1:1 by volume mixture of methyl ethyl ketone/toluene. The DN-1201L used methyl ethyl ketone alone, with a coating weight of 34.4 grams/square meter. In both, 2% by weight "Irganox" PS 800 antioxidant (based on rubber) were added to the coating solution.

The following tables summarize test data for the foregoing examples. Table 1 summarizes flexibility data with the examples shown adhered to a vinyl coated canvas substrate. The Cold Flex test was per DIN (German Industrial Standard) 53361 and the Flexibility test per DIN 53359. The Wind Flap test was undertaken by applying a 15 cm square film sample to a canvas substrate approximately 60 cm × 90 cm in size, mounting the resulting samples by a corner to a fixed object in an outside environment at temperatures at or below 0° C. To pass this test, the samples must not show cracking after exposure for 4 weeks. (This latter test is, of course, only of importance when canvas sided truck markings are the desired product.)

TABLE 1

| | Cold Temperature Flexibility | | |
|---|---|---|---|
| Example | Cold Flex | Single & Double Flex | Wind Flap |
| 1 | + | 100,000/100,000 | + |
| 2 | + | 100,000/100,000 | + |
| 3 | + | 100,000/100,000 | + |
| 4 | + | 100,000/100,000 | + |
| 5 | + | 100,000/63,700 | + |
| 6 | − | 10,000/10,000 | − |
| 7 | + | 100,000/78,900 | − |
| 8 | − | 100,000/36,600 | − |
| 9 | + | 100,000/100,000 | + |

Examples 1 to 4 and 9, after lamination to vinyl treated canvas, were placed in a humidity chamber for 24 hours at 40° C., 100% relative humidity. Examples 1 to 4 looked good after testing, but Example 9 had folds and bubbles after a relatively short time in the humidity chamber. Delamination occurred when Example 9 was moistened with water or with a conventional canvas cleaning solution.

Table 2 represents the T-peel adhesion of the composite examples to vinyl coated canvas. Two 25.4 mm × 120 mm samples of the example were laminated to a 70 mm × 140 mm canvas substrate. A 25.4 mm square piece of tape was applied over the same end of each sample to allow Instron jaw mounting. The other jaw contained the canvas, and the film was thus pulled from its canvas substrate at a rate of 305 mm/minute.

TABLE 2

| | T-Peel Adhesion | | |
|---|---|---|---|
| | Force to remove sample from substrate, N/dm | | |
| Example | 24 hr. | 1 Week @ 70° C. | 2 Weeks @ 70° C. |
| 1 | 60 | 56 | 58 |
| 10 | 112 | 46 | 44 |
| 11 | 74 | 68 | 64 |
| 6 | 25 | 8 | 2.0* |
| 12 | 31 | 11 | 7 |
| 14 | 59 | 42 | 40 |
| 15 | 60 | 56 | 55 |

*four weeks @ 70° C.

The above data clearly illustrates the superior performance of adhesives containing NBR therein.

What is claimed is:
1. An article comprising:
   (a) a canvas substrate having a surface comprising plasticized polyvinyl chloride;

(b) a first polyurethane polymeric film adhered to said surface with a pressure-sensitive adhesive consisting essentially of at least one nitrile butadiene rubber; and
(c) at least a second polyurethane polymeric film overlaying said first polyurethane polymeric film.

2. An article according to claim 1 wherein said first polyurethane polymeric film comprises an aliphatic polyurethane.

3. An article according to claim 1 wherein said at least second polyurethane polymeric film comprises an aliphatic polyester polyurethane.

4. An article according to claim 1 wherein said first polyurethane polymeric film comprises an aliphatic polyurethane and said at least second polyurethane polymeric film comprises an aliphatic polyester polyurethane.

5. An article according to claim 1 wherein said rubber is substantially fully hydrogenated.

6. An article according to claim 1 wherein said adhesive contains a mixture of substantially non-hydrogenated and substantially fully hydrogenated nitrile butadiene rubbers.

7. An article comprising:
(a) a canvas substrate having a surface comprising plasticized polyvinyl chloride;
(b) a first polyurethane polymeric film comprising an aliphatic polyurethane, said first polyurethane polymeric film adhered to said surface with a pressure-sensitive adhesive consisting essentially of at least one nitrile butadiene rubber; and
(c) at least a second polyurethane polymeric film comprising an aliphatic polyester polyurethane, said at least a second polyurethane film overlaying said first polyurethane polymeric film.

* * * * *